United States Patent
Hu et al.

(10) Patent No.: US 10,374,289 B2
(45) Date of Patent: Aug. 6, 2019

(54) RECONFIGURABLE 4-PORT MULTI-BAND MULTI-FUNCTION ANTENNA WITH A GROUNDED DIPOLE ANTENNA COMPONENT

(71) Applicant: Smart Antenna Technologies Ltd., Birmingham (GB)

(72) Inventors: Sampson Hu, Birmingham (GB); Xiang Gao, Birmingham (GB)

(73) Assignee: Smart Antenna Technologies Ltd., Birmingham (GB)

( * ) Notice: Subject to any disclaimer, the term of this patent is extended or adjusted under 35 U.S.C. 154(b) by 0 days.

(21) Appl. No.: 15/564,613

(22) PCT Filed: Apr. 7, 2016

(86) PCT No.: PCT/GB2016/050985
§ 371 (c)(1),
(2) Date: Oct. 5, 2017

(87) PCT Pub. No.: WO2016/162685
PCT Pub. Date: Oct. 13, 2016

(65) Prior Publication Data
US 2018/0076505 A1    Mar. 15, 2018

(30) Foreign Application Priority Data

Apr. 7, 2015 (GB) .................................. 1505910.8
Jul. 23, 2015 (GB) .................................. 1513043.8

(51) Int. Cl.
*H04M 1/00* (2006.01)
*H01Q 1/24* (2006.01)
(Continued)

(52) U.S. Cl.
CPC ............ *H01Q 1/243* (2013.01); *H01Q 1/521* (2013.01); *H01Q 5/335* (2015.01); *H01Q 5/50* (2015.01);
(Continued)

(58) Field of Classification Search
CPC .......... H01Q 1/243; H01Q 21/28; H01Q 1/48; H01Q 1/50; H01Q 9/42; H01Q 1/38;
(Continued)

(56) References Cited

U.S. PATENT DOCUMENTS

| 2006/0214857 A1 | 9/2006 | Ollikainen |
| 2009/0207092 A1* | 8/2009 | Nysen ................. H01Q 1/2275 343/876 |
| 2014/0266937 A1* | 9/2014 | Mahanfar ............. H01Q 21/28 343/726 |

FOREIGN PATENT DOCUMENTS

| EP | 2385584 A1 | 1/2010 |
| EP | 2879232 A1 | 6/2015 |

(Continued)

OTHER PUBLICATIONS

International Search Report and Written Opinion for corresponding PCT Application No. PCT/GB2016/050985, dated Jun. 29, 2016, 21 pp.

(Continued)

*Primary Examiner* — Ajibola A Akinyemi
(74) *Attorney, Agent, or Firm* — Shumaker & Sieffert, P.A.

(57) ABSTRACT

There is disclosed a reconfigurable antenna device comprising a substrate having first and second opposed ends and first and second opposed side edges, the substrate incorporating a main groundplane. The antenna device further comprises a dipole antenna having first and second arms each having (Continued)

a proximal portion and a distal portion, the proximal portions extending substantially adjacent and parallel to the first end of the substrate and the distal portions respectively extending substantially adjacent and parallel to the first and second side edges of the substrate. Distal ends of the first and second arms are connected to the main groundplane or otherwise grounded. Additionally, there is provided a main chassis antenna having first and second arms extending substantially adjacent and parallel to the first end of the substrate. The main chassis antenna is configured for excitation by RF currents in the main groundplane. Finally, there are provided first and second auxiliary chassis antennas, the first auxiliary chassis antenna being disposed at the first end of the substrate substantially adjacent to the proximal portion of first arm of the dipole antenna and the first arm of the main chassis antenna, and the second auxiliary chassis antenna being disposed at the first end of the substrate substantially adjacent to the proximal portion of the second arm of the dipole antenna and the second arm of the main chassis antenna. The first and second auxiliary chassis antennas are configured for excitation by RF currents in the main groundplane.

27 Claims, 10 Drawing Sheets

(51) Int. Cl.
    *H01Q 1/52*     (2006.01)
    *H01Q 21/28*     (2006.01)
    *H01Q 5/335*     (2015.01)
    *H01Q 5/50*     (2015.01)
    *H01Q 7/00*     (2006.01)
    *H01Q 9/26*     (2006.01)
    *H01Q 9/40*     (2006.01)
    *H01Q 9/42*     (2006.01)
    *H04B 7/0413*     (2017.01)

(52) U.S. Cl.
    CPC .............. *H01Q 21/28* (2013.01); *H01Q 7/00* (2013.01); *H01Q 9/26* (2013.01); *H01Q 9/40* (2013.01); *H01Q 9/42* (2013.01); *H04B 7/0413* (2013.01)

(58) Field of Classification Search
    CPC .......... H01Q 7/00; H01Q 21/30; H01Q 5/371; H01Q 13/10; H01Q 9/0421; H01Q 9/0407; H01Q 9/30; H01Q 1/24; H01Q 1/42; H01Q 1/521; H01Q 5/378; H01Q 5/321
    USPC ...................................................... 455/575.7
    See application file for complete search history.

(56) References Cited

FOREIGN PATENT DOCUMENTS

| | | |
|---|---|---|
| GB | 2449910 A | 10/2008 |
| GB | 2507788 A | 5/2014 |
| WO | 2012072969 A1 | 6/2012 |
| WO | 2014020302 A1 | 2/2014 |

OTHER PUBLICATIONS

Mayes, "Frequency-Independent Antennas," In: Antenna Handbook: Theory, Applications and Design, Dec. 31, 1988, Springer, New York, pp. 9-75 and 9-95.

Combined Search and Examination Report from counterpart GB Patent Application No. GB1513043.8, dated Jan. 26, 2016, 8 pp.

International Preliminary Report on Patentability for corresponding PCT Application No. PCT/GB2016/050985, dated Oct. 10, 2017, 13 pp.

\* cited by examiner

RECONFIGURABLE 4-PORT MULTI-BAND MULTI-FUNCTION ANTENNA WITH A GROUNDED DIPOLE ANTENNA COMPONENT

This application is a national stage application under 35 U.S.C. § 371 of PCT Application No. PCT/GB2016/050985, filed Apr. 7, 2016, which claims the benefit of Great Britain Application No. 1505910.8, filed Apr. 7, 2015 and Great Britain Application No. 1513043.8, filed Jul. 23, 2015. The entire contents of each of PCT Application No. PCT/GB2016/050985, Great Britain Application No. 1505910.8 and Great Britain Application No. 1513043.8 are incorporated herein by reference in their entirety.

This invention relates to a reconfigurable antenna. Particularly, but not exclusively, the invention relates to a reconfigurable multiple-input multiple-output (MIMO) antenna for use in a portable electronic device such as a smartphone handset, a tablet or a laptop.

BACKGROUND

Multiple-input multiple-output (MIMO) wireless systems exploiting multiple antennas as both transmitters and receivers have attracted increasing interest due to their potential for increased capacity in rich multipath environments. Such systems can be used to enable enhanced communication performance (i.e. improved signal quality and reliability) by use of multi-path propagation without additional spectrum requirements. This has been a well-known and well-used solution to achieve high data rate communications in relation to 2G and 3G communication standards. For indoor wireless applications such as router devices, external dipole and monopole antennas are widely used. In this instance, high-gain, omni-directional dipole arrays and collinear antennas are most popular. However, very few portable devices with MIMO capability are available in the marketplace. The main reason for this is that, when gathering several radiators in a portable device, the small allocated space for the antenna limits the ability to provide adequate isolation between each radiator.

A reconfigurable MIMO antenna is known from WO 2012/072969 (the content of which is incorporated into the present disclosure by reference). An embodiment is described in which the antenna comprises a balanced antenna located at a first end of a PCB and a two-port chassis-antenna located at an opposite second end of the PCB. However, in certain applications this configuration may not be ideal or even practical since it requires two separate areas in which to locate each antenna. However, as mentioned above this spacing was chosen to provide adequate isolation between each antenna structure.

Another reconfigurable antenna is known from WO 2014/020302 (the content of which is incorporated into the present disclosure by reference). This antenna comprises a balanced antenna and an unbalanced antenna mounted on a supporting PCB substrate, with both the balanced antenna and the unbalanced antenna located at the same end of the substrate. The antenna may be configured as a chassis antenna for use in a portable device and may be configured for MIMO applications. In one embodiment of the antenna of WO 2014/020302, there is provided a floating groundplane connected to the balanced antenna. The floating groundplane is constituted by a rectangular metal patch located on a first surface of the substrate, centrally below feed lines provided on the first surface to feed the balanced and unbalanced antennas. A first matching circuit configured to excite the arms of the balanced antenna is located on the floating groundplane. The unbalanced antenna is mounted on a second surface of the substrate, opposed to the first surface, and is connected to a second matching circuit mounted on the PCB substrate. In another embodiment, the floating groundplane may be incorporated in one arm of the balanced antenna, thereby saving space on the PCB substrate. Each matching circuit is coupled to a signal port, and the antenna as disclosed therefore provides only two ports.

BRIEF SUMMARY OF THE DISCLOSURE

Viewed from a first aspect, there is provided a reconfigurable antenna device comprising:

i) a substrate having first and second opposed ends and first and second opposed side edges, the substrate incorporating a main groundplane;

ii) a dipole antenna having first and second arms each having a proximal portion and a distal portion, the proximal portions extending substantially adjacent and parallel to the first end of the substrate and the distal portions respectively extending substantially adjacent and parallel to the first and second side edges of the substrate, wherein distal ends of the first and second arms are connected to the main groundplane or otherwise grounded;

iii) a main chassis antenna having first and second arms extending substantially adjacent and parallel to the first end of the substrate, the main chassis antenna being configured for excitation by RF currents in the main groundplane; and iv) first and second auxiliary chassis antennas, the first auxiliary chassis antenna being disposed at the first end of the substrate substantially adjacent to the proximal portion of first arm of the dipole antenna and the first arm of the main chassis antenna, and the second auxiliary chassis antenna being disposed at the first end of the substrate substantially adjacent to the proximal portion of the second arm of the dipole antenna and the second arm of the main chassis antenna, the first and second auxiliary chassis antennas being configured for excitation by RF currents in the main groundplane.

By "reconfigurable" is meant an antenna capable of dynamically modifying its frequency and radiation properties in a controlled and reversible manner. In order to provide a dynamical response, reconfigurable antennas generally integrate an inner mechanism (such as RF switches, varactors, mechanical actuators or tuneable materials) that enable the intentional redistribution of the RF currents over the antenna surface and produce reversible modifications over its properties. Reconfigurable antennas differ from other smart antennas because the reconfiguration mechanism lies inside the antenna rather than in an external beamforming network. The reconfiguration capability of reconfigurable antennas is used to maximize the antenna performance in a changing scenario or to satisfy changing operating requirements.

An important feature of certain embodiments is that the first and second arms of the dipole antenna are each grounded at their respective ends.

The substrate may comprise a printed circuit board substrate, and the main groundplane may be a conductive layer on one surface of the substrate or disposed between upper and lower surfaces of the substrate.

The antenna device of certain embodiments may be considered as comprising four antennas integrated into a small space of a radio communications device: the grounded dipole antenna, the main chassis antenna, and the first and second auxiliary chassis antennas.

The arms of the grounded dipole antenna may be constructed as a frame antenna (incorporating conductive components of a casing of a handset, tablet or laptop, for example conductive components on an exterior of the casing, which may be provided with a dielectric coating), or may be formed as a conductive tracks on an inside of a casing of a handset, tablet or laptop, for example by way of laser direct structuring (LDS) or other suitable techniques. In some embodiments, both frame antenna and conductive track antenna sections may be employed.

Similarly, the arms of the main chassis antenna may be constructed as a frame antenna or conductive tracks on an inside of a casing, or a mixture of both.

The first and second auxiliary chassis antennas may be constructed as conductive tracks on an inside of a casing, for example by way of LDS.

Other conductive structures, such as self-supporting conductive elements or printed/etched conductive tracks may be used in some embodiments.

The grounded dipole antenna and the main chassis antenna are the main antennas. Each of these antennas may be provided with associated matching circuits. Each of the main antennas may be configured with only one output port after its associated matching circuit. Alternatively, one or other or both of the main antennas may configured with a multi-output port after its associated matching circuit. One of the main antennas may be configured to support the 4G LTE and GPS frequency bands, while the other may be configured to support only the 4G LTE frequency bands. The choice as to which of the main antennas is configured to support both 4G LTE and GPS and which is configured to support just 4G LTE may be made depending on particular operational requirements. It will be understood that the main antennas may be configured to support other frequency bands as required.

The first and second auxiliary chassis antennas may be configured to support other wireless services, such as WiFi 2.4 GHz/5.5 GHz, GPS and/or Bluetooth® frequency bands. The first and second auxiliary chassis antennas can be configured to support other frequency bands as required. Each of the auxiliary antennas may be provided with associated matching circuits. Each of the auxiliary antennas may be configured with only one output port after its associated matching circuit, or one or both of the auxiliary antennas may be configured with a multi-output port.

Each antenna has a respective feeding point, and the feeding points may advantageously be positioned close to each other. This facilitates the use of a single chip or integrated circuit component for providing the respective matching circuits for all four antennas.

If the main groundplane has a substantially symmetric geometry (for example, if the main groundplane is substantially rectangular), the feeding points for the grounded dipole antenna and the main chassis antenna may be located at a centre point of each antenna. The feeding points of the first and second auxiliary chassis antennas may then be located symmetrically with respect to each other on either side of a centre line of the main groundplane. In addition, the first and second arms of the grounded dipole antenna may be substantially symmetrical about the centre line, as may the first and second arms of the main chassis antenna. The first and second auxiliary chassis antennas may also be arranged substantially symmetrical to each other on either side of the centre line. Although a substantially symmetric arrangement can promote good isolation between the respective antennas, it is not essential, and some embodiments may employ asymmetric configurations. For example, a groundplane with asymmetric holes or apertures therein may still perform satisfactorily.

Good isolation between the grounded dipole antenna and the main chassis antenna is achieved because the modes excited by these two antennas are substantially orthogonal. Good isolation between the first and second auxiliary chassis antennas can be promoted by placing an appropriate RF resonator between the auxiliary chassis antennas. The current from one auxiliary chassis antenna port will flow mainly by way of this resonator, with just a small portion of the current flowing to the port of the other auxiliary chassis antenna, thus providing good isolation.

The four antennas of certain embodiments can be seen as comprising at least five elements: the main chassis antenna element, two auxiliary chassis antenna elements, and the two arms of the grounded dipole antenna. The main chassis antenna element and the two auxiliary chassis antenna elements are excited directly by the RF groundplane. The two arms of the grounded dipole antenna are fed together as a dipole and connected to RF ground at both side edges of the substrate. In order to provide good isolation between the different antenna ports, it is preferred that the structure of these five elements is substantially symmetric about the centre line of the main groundplane (the line from the midpoint of the first end of the groundplane to the midpoint of the second, opposed end of the groundplane). However, asymmetric configurations may be preferred in certain applications, for example to provide increased bandwidth.

Matching circuitry may be provided for each of the four antennas.

The grounded dipole antenna may be configured as a balanced antenna. In some embodiments, a balun is provided so as to allow the balanced mode to be excited with an unbalanced feed. When a balun is provided, the grounded dipole antenna and the three chassis antennas can share the same main groundplane. However, in other embodiments, the balanced mode can still be excited without the use of a balun. This is possible by making the geometry of the grounded dipole antenna as close to symmetric as possible. The grounded dipole antenna may be fed by a coaxial cable, the cable being attached to the first arm of the grounded dipole antenna. A dummy cable, identical to the cable connected to the first arm, may then be symmetrically connected to the second arm of the grounded dipole antenna. This helps to maintain RF symmetry and significantly reduces the unbalanced current on the feeding cable. The cables may follow a path defined by the first and second arms respectively of the grounded dipole antenna. The grounded dipole antenna in these embodiments may be configured as or similarly to a loop antenna, and may be provided with a matching circuit that is mounted on a separate groundplane to that of the main groundplane of the three chassis antennas. The separate groundplane may be arranged above or below, for example parallel to, the main groundplane.

The main chassis antenna may be fed by a cable running along the centre line of the groundplane. The first and second auxiliary chassis antennas may be fed by respective cables running symmetrically parallel to the centre line of the groundplane. Other arrangements are possible where it is not essential that the antenna device as a whole is configured symmetrically.

Multiple matching circuits may be provided for the various antenna elements, and different modes of operation may be selected by switching between the various matching circuits.

Each matching circuit may comprise at least one variable capacitor to tune the frequency of its associated antenna element over a desired frequency range. The variable capacitor may be constituted by multiple fixed capacitors with switches, or by varactors or MEMs capacitors. In addition, one or more of the matching circuits may further be provided with at least one inductor, which may be fixed or variable.

The grounded dipole antenna and its associated matching circuitry may be coupled to a first signal port.

The main chassis antenna and its associated matching circuitry may be coupled to a second signal port.

One of the grounded dipole antenna and the main chassis antenna may be configured to support both the GPS band and one of the 4G LTE bands, while the other may be configured to support the other 4G LTE bands. Switches may be provided in the matching circuitry to allow switching between different 4G LTE bands.

The first auxiliary chassis antenna and its associated matching circuitry may be coupled to a third signal port.

The second auxiliary chassis antenna and its associated matching circuitry may be coupled to a fourth signal port.

Switches may be provided in the matching circuitry for the first and second auxiliary chassis antennas to allow switching between the 2.4 GHz and 5 GHz WiFi bands, for example.

High isolations between the different ports of the antenna device can be obtained by tuning or adjusting the positions of the feeding points of the respective antennas. The main chassis antenna excites the chassis mode while the grounded dipole antenna excites the balanced mode. The two auxiliary chassis antennas will also excite the chassis mode. The chassis mode of the main chassis antenna is substantially orthogonal to the balanced mode of the grounded dipole antenna. Accordingly, even though the main chassis antenna and the grounded dipole antenna are located close to each other, their mutual isolation is still relatively high. The respective isolations of the first and second auxiliary chassis antennas can be adjusted by adjusting the positions, dimensions and shapes of these two antennas.

It is therefore possible to obtain high isolation between:
i) the third and fourth ports for the two auxiliary chassis antenna ports (for example at WiFi bands 2.4 GHz/5 GHz);
ii) the third/fourth ports and the first/second ports (for example at the 4G LTE frequency bands 0.704 GHz to 0.96 GHz, 1.71 GHz to 2.17 GHz, 2.5 GHz to 2.69 GHz and 3.4 GHz to 3.8 GHz);
iii) the third/fourth ports and either the first port or the second port depending on which of the grounded dipole antenna and the main chassis antenna supports the GPS frequency bands (for example around 1.5 GHz).

BRIEF DESCRIPTION OF THE DRAWINGS

Embodiments of the invention are further described hereinafter with reference to the accompanying drawings, in which.

DETAILED DESCRIPTION

Figure 1:
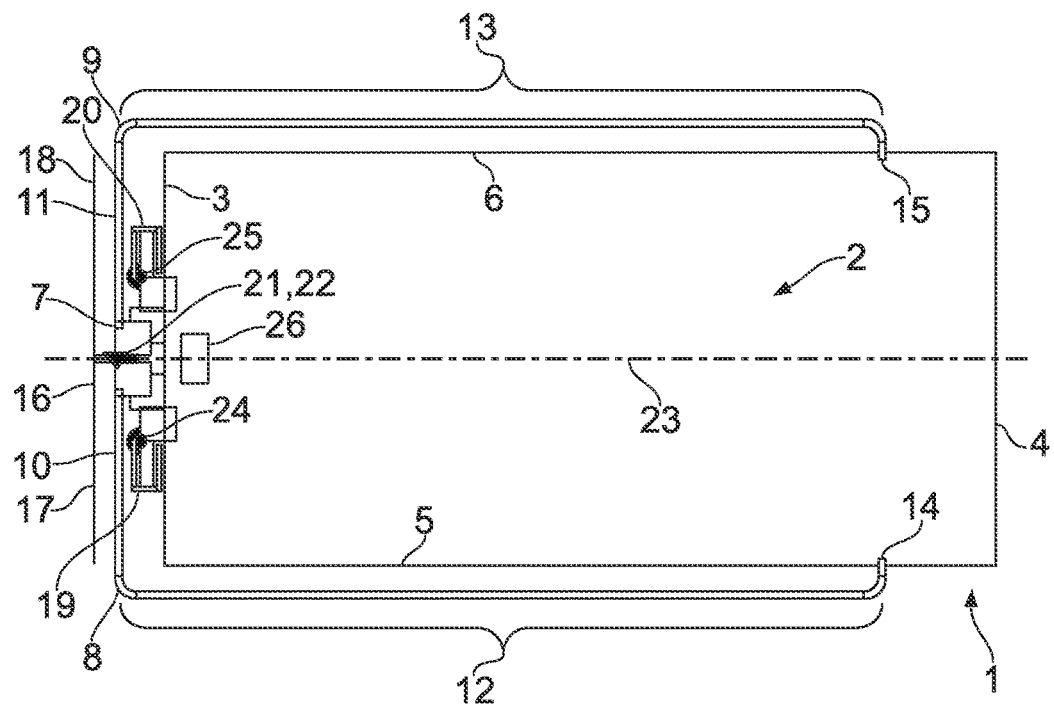
FIG. 1 is a schematic representation of a first embodiment.

FIG. 1 shows the general layout of a first embodiment, comprising a generally rectangular substrate 1 provided with a conductive groundplane 2. The substrate 1 has a first end 3, an opposed second end 4, and first and second side edges 5, 6.

There is further provided a dipole antenna 7 having first and second arms 8, 9 each having a proximal portion 10, 11 and a distal portion 12, 13. The proximal portions 10, 11 extend substantially adjacent and parallel to the first end 3 of the substrate 1 and the distal portions 12, 13 respectively extend substantially adjacent and parallel to the first and second side edges 5, 6 of the substrate 1. Distal ends 14, 15 of the first and second arms 8, 9 are connected to the main groundplane 2.

Additionally, there is provided a main chassis antenna 16 having first and second arms 17, 18 extending substantially adjacent and parallel to the first end 3 of the substrate 1, the main chassis antenna 16 being configured for excitation by RF currents in the main groundplane 2.

Furthermore, there are provided first and second auxiliary chassis antennas 19, 20, the first auxiliary chassis antenna 19 being disposed at the first end 3 of the substrate 1 substantially adjacent to the proximal portion 10 of the first arm 8 of the dipole antenna 7 and the first arm 17 of the main chassis antenna 16, and the second auxiliary chassis antenna 20 being disposed at the first end 3 of the substrate 1 substantially adjacent to the proximal portion 11 of the second arm 9 of the dipole antenna 7 and the second arm 18 of the main chassis antenna 16. The first and second auxiliary chassis antennas 19, 20 are configured for excitation by RF currents in the main groundplane 2.

The grounded dipole antenna 7 and the main chassis antenna 16 are provided with respective feed points 21, 22 located on a centre line 23 of the groundplane 2. The first and second auxiliary chassis antennas 19, 20 are provided with feed points 24, 25 located symmetrically about the centre line 23.

Matching circuits for all four antennas 7, 16, 19, 20 are provided in a chip 26 mounted on the substrate 1. The antenna matching schematics are shown in FIGS. 2 and 3.

Figure 2:
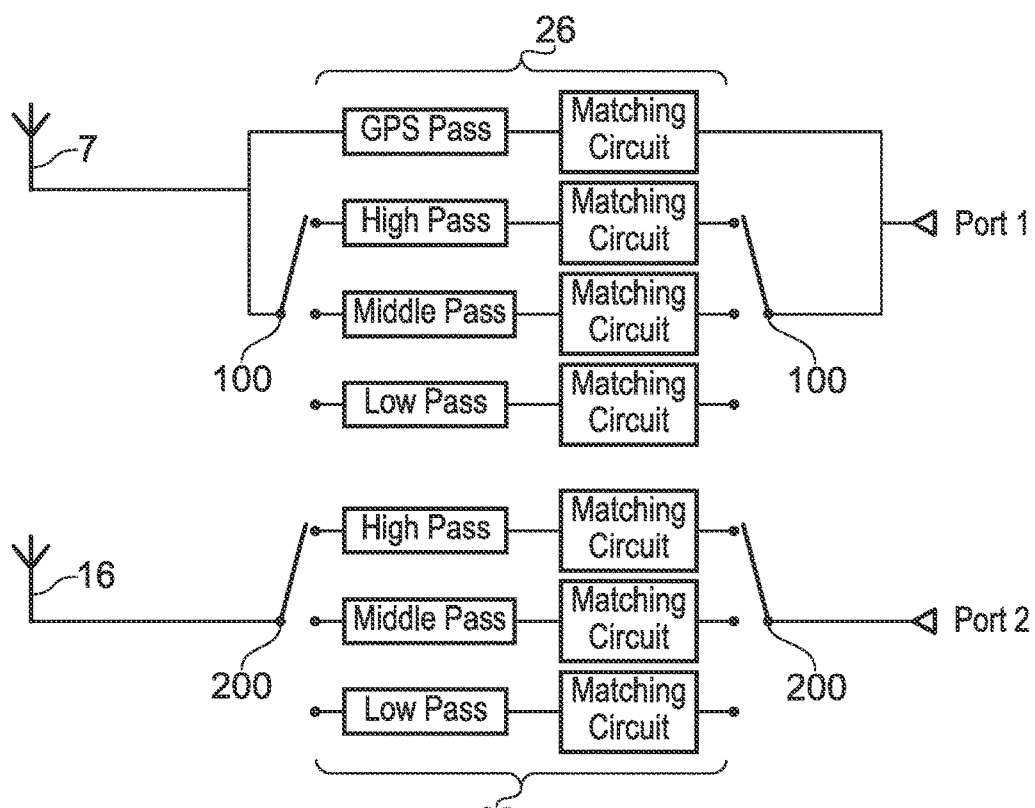
FIG. 2 shows an outline matching circuit arrangement for the grounded dipole antenna and the main chassis antenna.

FIG. 2 describes the schematics for one example of the two main antennas. For two main antennas, each antenna has one output port. One of the main antennas can cover the GPS permanently and one of the 4G LTE frequency bands.

Suitable good quality switches 100 can be used to switch different 4G LTE frequency bands. For the other main antenna just covering the 4G LTE frequency bands, good quality switches 200 can also be used to switch different 4G LTE frequency bands.

Figure 3:
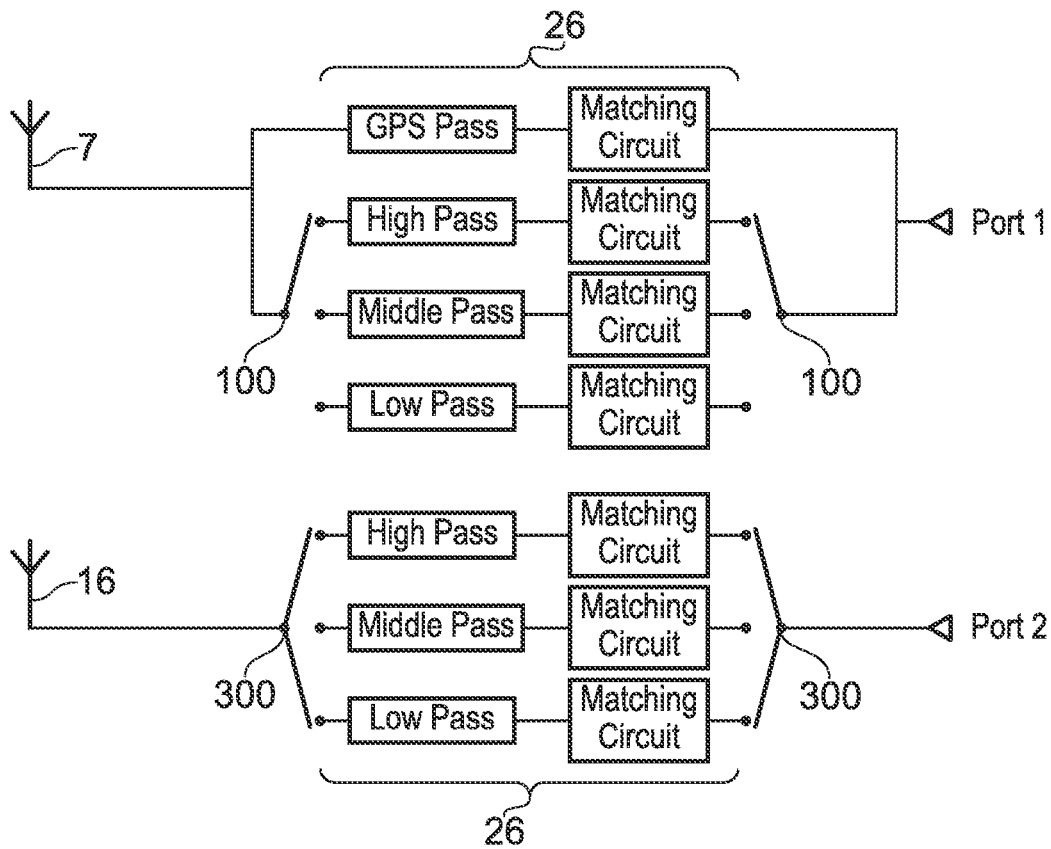
FIG. 3 shows a variant of the arrangement of FIG. 2.

FIG. 3 shows an alternative arrangement in which one of the main antennas is provided with switches 300 to allow two different matching circuits to be used simultaneously, thus allowing different combinations of passbands to be used at the same time, for example low pass and high pass, low pass and middle pass, or high pass and middle pass. This means that the relevant main antenna can handle two (in some cases, more than two) different frequency bands simultaneously.

Figure 4:
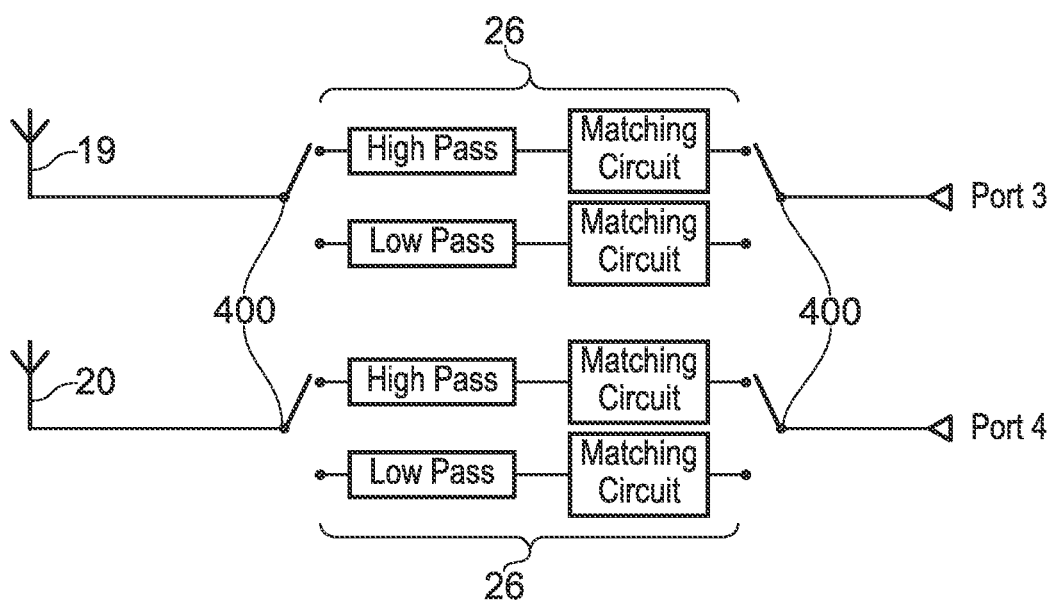
FIG. 4 shows an outline matching circuit arrangement for the first and second chassis antennas.

FIG. 4 shows a schematic for one example of the two auxiliary chassis antennas. For two auxiliary antennas, each antenna has one output port. Both auxiliary antennas can cover the WiFi frequency bands. Suitable good quality switches 400 can be used for the two auxiliary antennas to switch different WiFi frequency bands (i.e., 2.4 GHz or 5.5 GHz).

Figure 5:
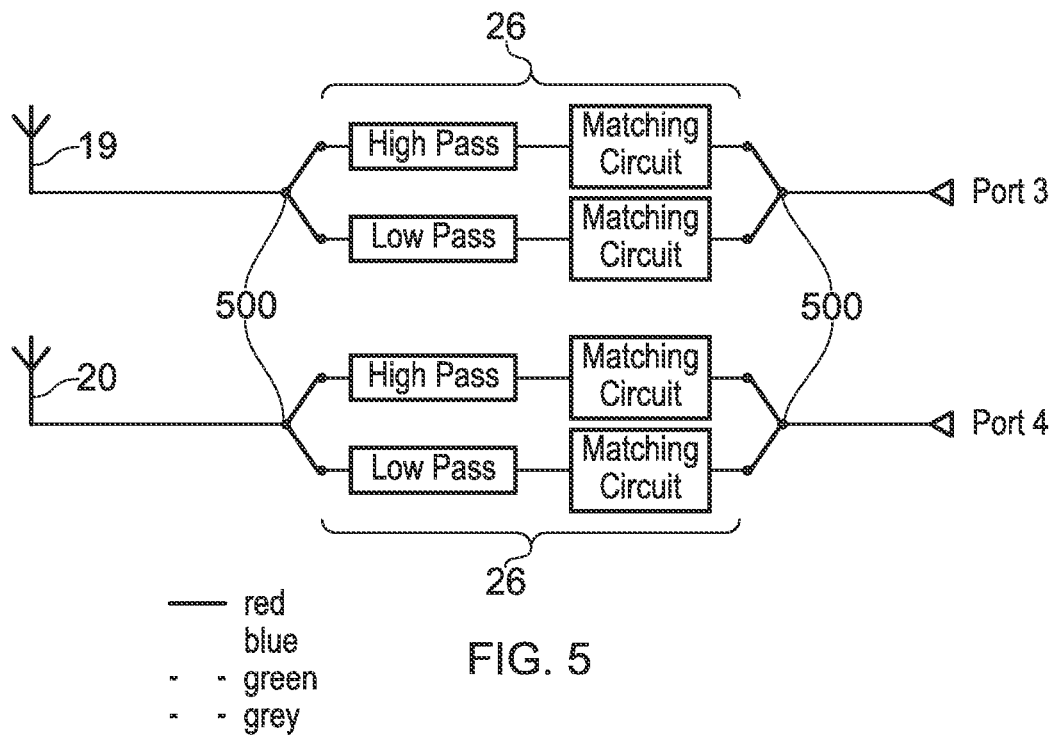
FIG. 5 shows a variant of the arrangement of FIG. 4.

FIG. 5 shows a variant of the FIG. 4 embodiment, where each auxiliary antenna is configured to handle two different frequency bands at the same time by using high and low pass filters and two separate matching circuits. For example, this embodiment can support MIMO dual band WiFi at 2.4 and 5.5 GHz by way of switches 500.

Figure 6:
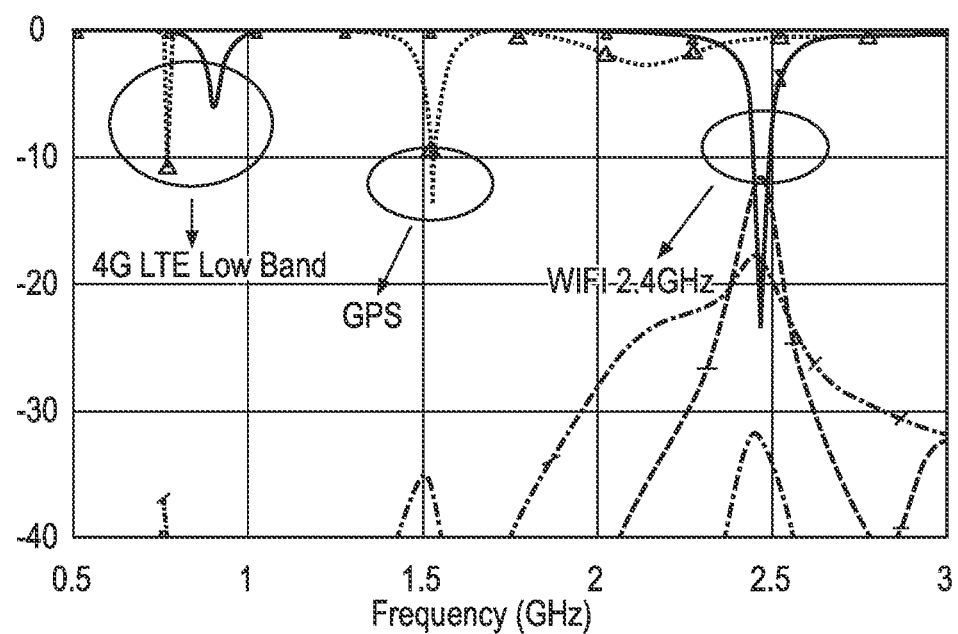
FIG. 6 shows simulation results for the embodiment of FIG. 1 covering the 4G LTE low band, GPS band and WiFi 2.4 GHz band.

FIG. 6 displays some example simulation results covering 4G LTE low band, GPS and WiFi 2.4 GHz for one antenna example structure under this concept. The simulation results show that the 4G LTE low bands can be respectively covered by the two main antennas. By tuning the components of the corresponding matching circuits, the 4G LTE low bands can be fully covered. One of the main antennas will also support GPS. Two auxiliary antennas both work at WiFi 2.4 GHz. From the results, good isolations can be obtained between different antenna ports. In this case, the isolations can be listed as below:

i) The isolation better than 30 dB between two main antenna ports, i.e., Port 1 and Port 2, at 4G LTE low band;

ii) The isolation better than 10 dB between two auxiliary antenna ports, i.e., Port 3 and Port 4, at WIFI 2.4 GHz;

iii) The isolation better than 15 dB between each auxiliary antenna port and each main antenna port, i.e., Port 3/Port 4 and Port 1/Port 2, at WiFi 2.4 GHz;

iv) The isolation better than 30 dB between the main antenna port supporting GPS and other antenna ports, i.e., Port 1 and Port 2/Port 3/Port 4, at the GPS frequencies.

Figure 7:
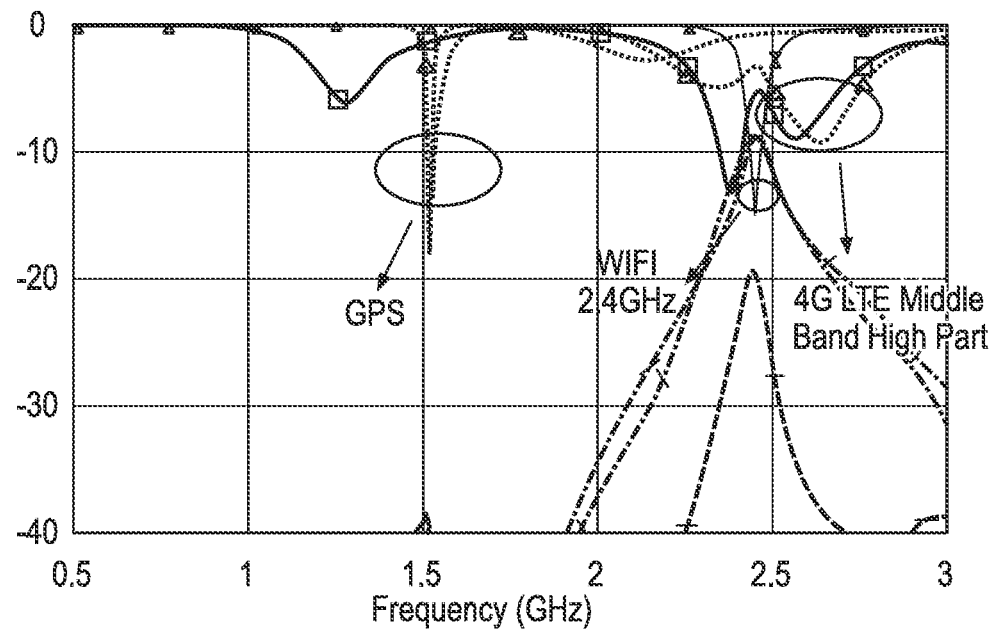
FIG. 7 shows simulation results for the embodiment of FIG. 1 covering the 4G LTE middle band high end, GPS band and WiFi 2.4 GHz band.

FIG. 7 displays some example simulation results covering 4G LTE middle band high part, GPS and WiFi 2.4 GHz for one antenna example structure under this concept. The simulation results show that the 4G LTE middle band high part can be respectively covered by the two main antennas. By tuning the components of the corresponding matching circuits, the 4G LTE middle band high part can be fully covered. One of the main antennas will also support GPS. Two auxiliary antennas both work at WiFi 2.4 GHz. From the results, good isolations can be obtained between different antenna ports. In this case, the isolations can be listed as below:

i) The isolation better than 30 dB between two main antenna ports, i.e., Port 1 and Port 2, at 4G LTE middle band high part;

ii) The isolation around 20 dB between two auxiliary antenna ports, i.e., Port 3 and Port 4, at WiFi 2.4 GHz;

iii) The isolation around 10 dB between each auxiliary antenna port and each main antenna port, i.e., Port 3/Port 4 and Port 1/Port 2, at WiFi 2.4 GHz;

iv) The isolation better than 30 dB between the main antenna port supporting GPS and other antenna ports, i.e., Port 1 and Port 2/Port 3/Port 4, at the GPS frequencies.

Figure 8:
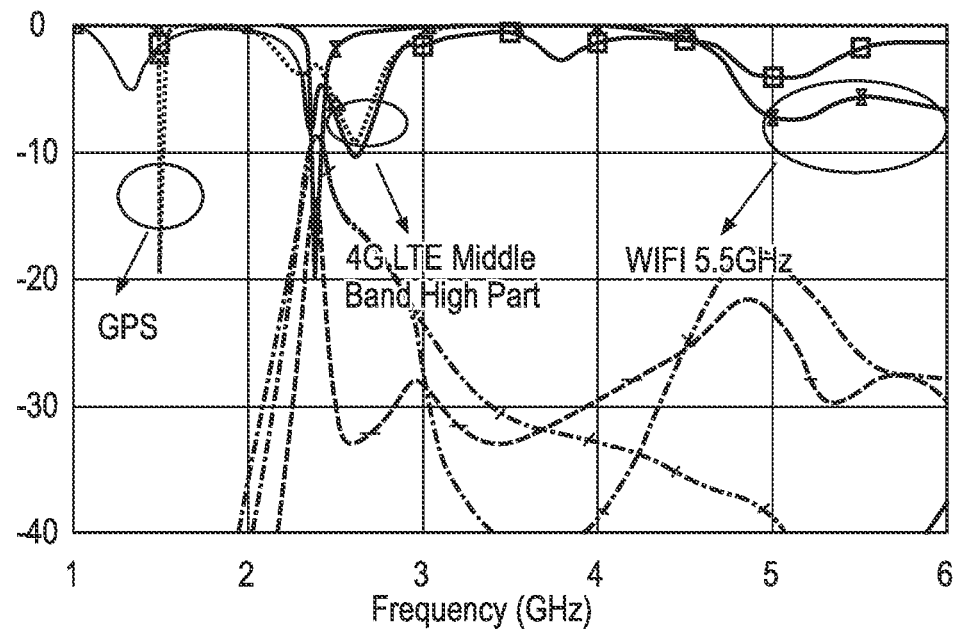
FIG. 8 shows simulation results for the embodiment of FIG. 1 covering the 4G LTE middle band high end, GPS band, WiFi 2.4 GHz and WiFi 5.5 GHz band.
Figure 9:
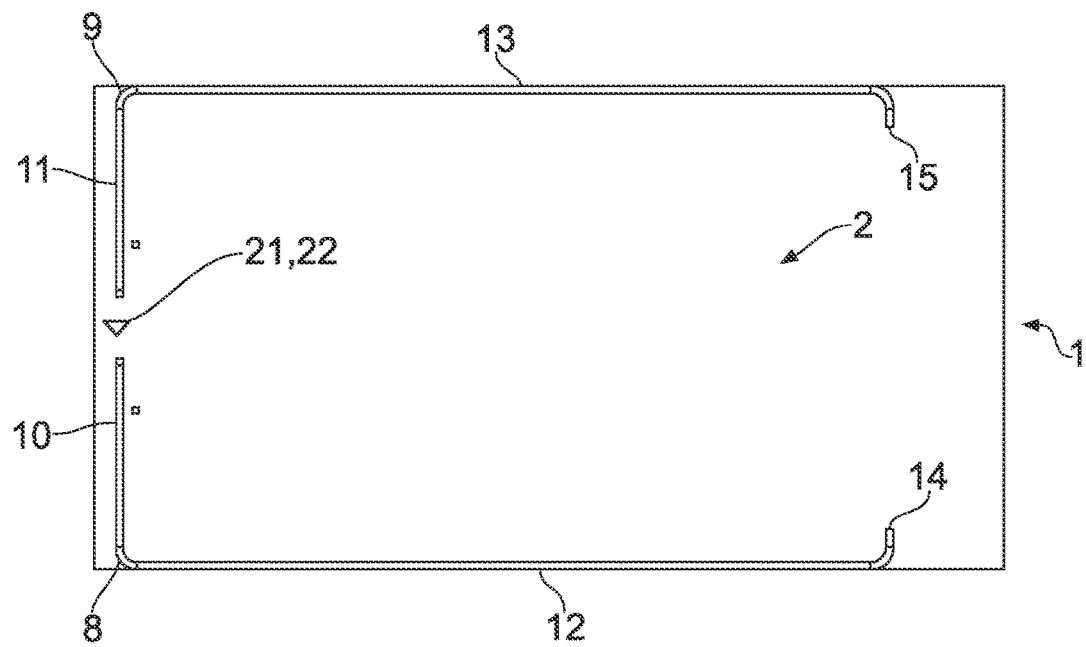
FIGS. 9 to 16 show various stages in the construction of the embodiment of FIG. 1.
Figure 10:
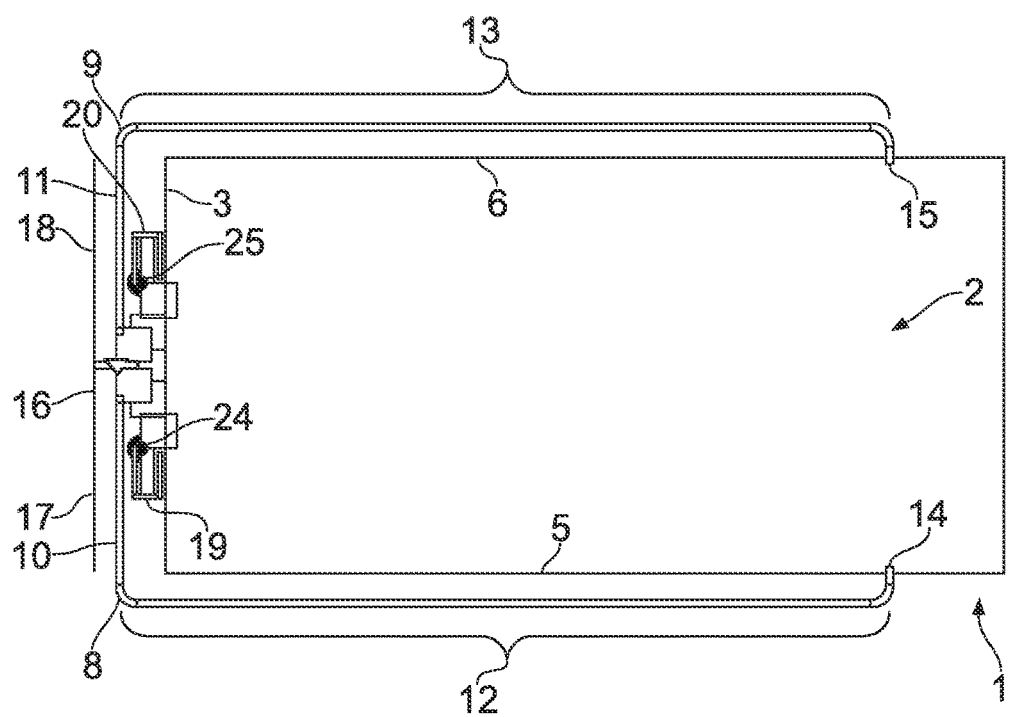
Figure 11:
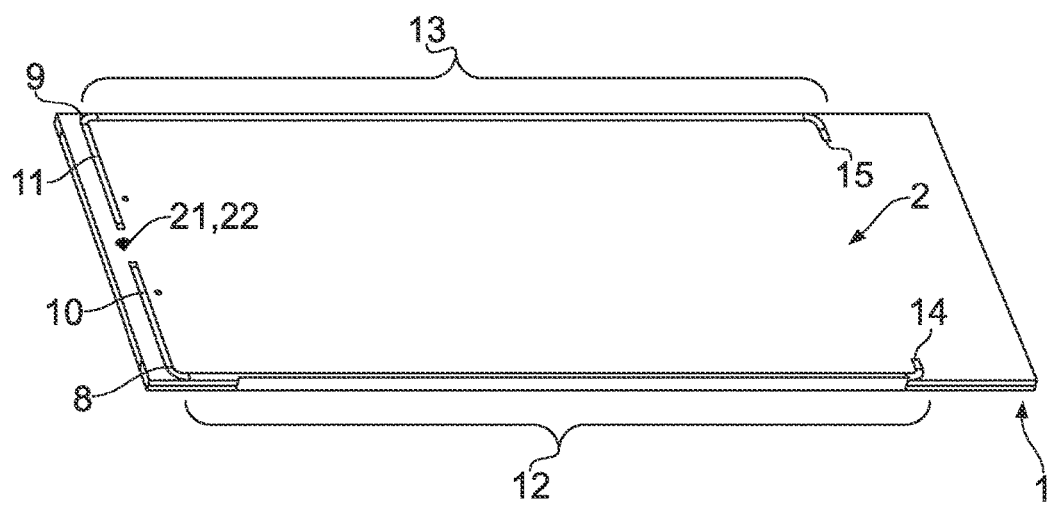
Figure 12:
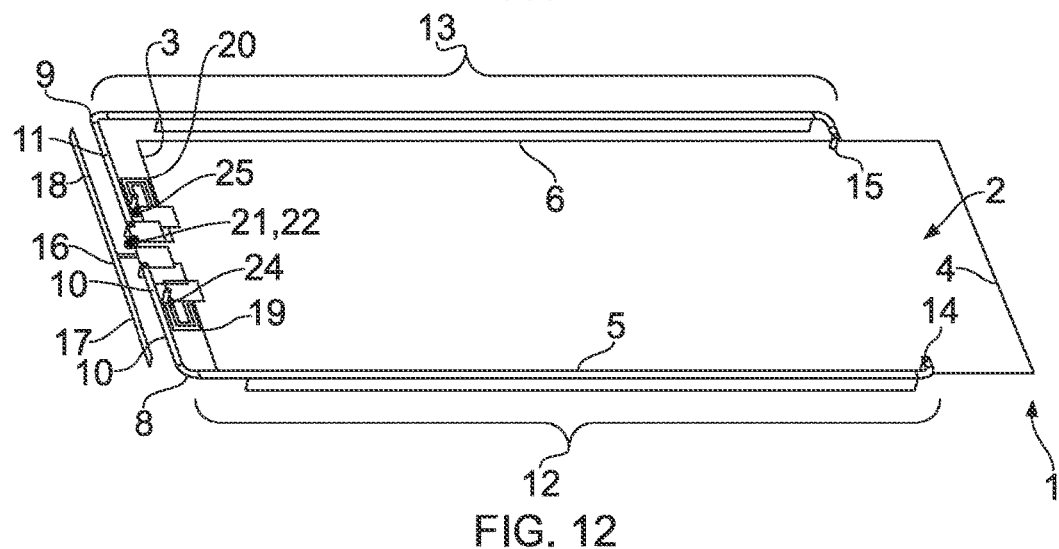
Figure 13:
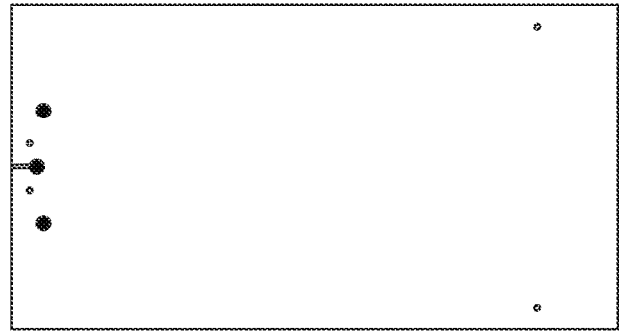
Figure 14:
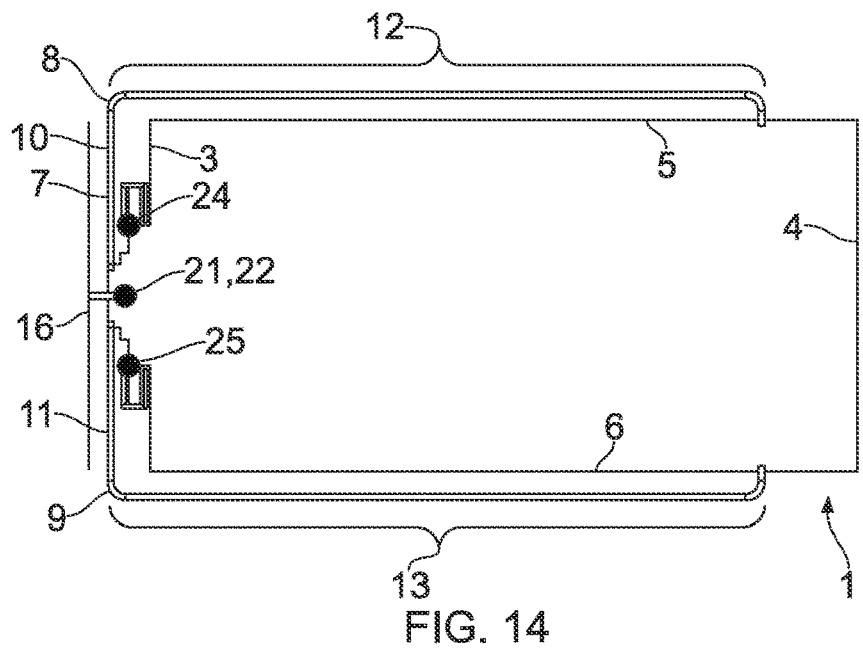
Figure 15:
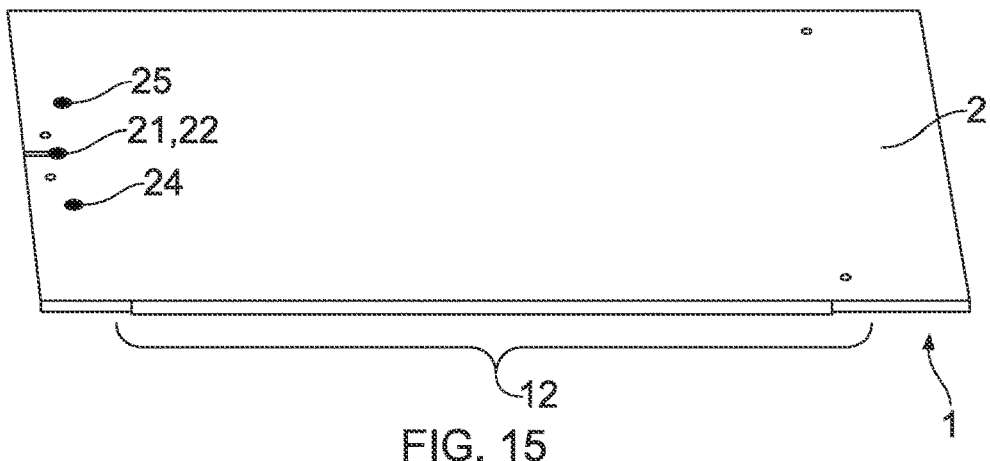
Figure 16:
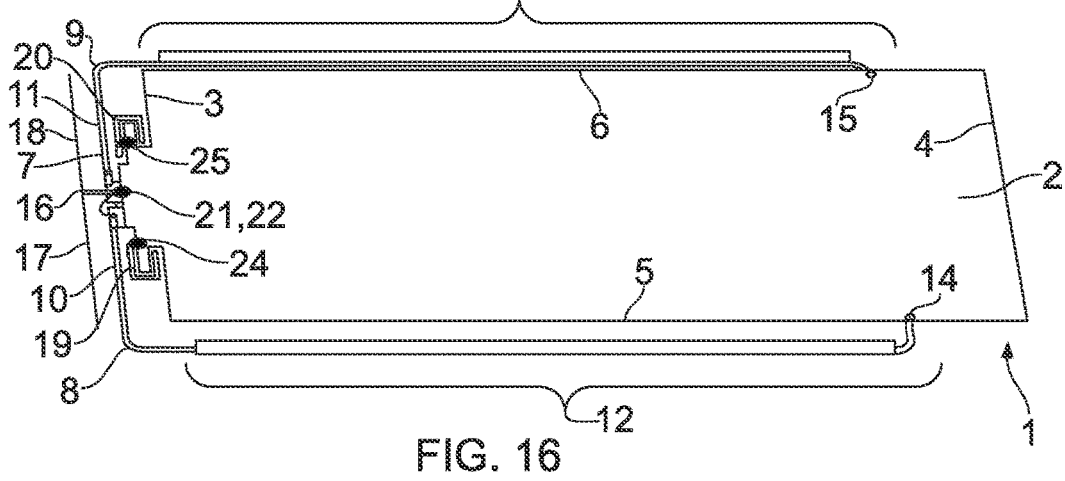

FIG. 8 displays some example simulation results covering 4G LTE middle band high part, GPS and WiFi 2.4 GHz and 5.5 GHz for one antenna example structure under this concept. The simulation results show that the 4G LTE middle band high part can be respectively covered by the two main antennas. By tuning the components of the corresponding matching circuits, the 4G LTE middle band high part can be fully covered. One of the main antennas will also support GPS. Two auxiliary antennas both work at WiFi 2.4 GHz and 5.5 GHz simultaneously. From the results, good isolations can be obtained between different antenna ports. In this case, the isolations can be listed as below:

i) The isolation better than 15 dB between two main antenna ports, i.e., Port 1 and Port 2, at 4G LTE middle band high part;

ii) The isolation around 20 dB between two auxiliary antenna ports, i.e., Port 3 and Port 4, at WiFi 5.5 GHz; The isolation around 15 dB between two auxiliary antenna ports, i.e., Port 3 and Port 4, at WiFi 2.4 GHz;

iii) The isolation better than 10 dB between each auxiliary antenna port and each main antenna port, i.e., Port 3/Port 4 and Port 1/Port 2, at WiFi 5.5 GHz;

iv) The isolation better than 30 dB between the main antenna port supporting GPS and other antenna ports, i.e., Port 1 and Port 2/Port 3/Port 4, at the GPS frequencies.

FIGS. 9 to 16 show progressive stages in the assembly of an embodiment of the present application, with parts being labelled as in FIG. 1.

Figure 17:
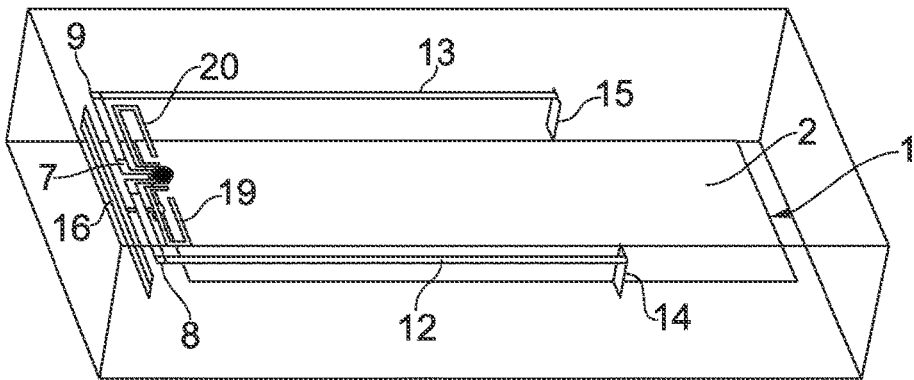
FIG. 17 is a schematic representation of a second embodiment.

FIG. 17 shows a first example combination of four antennas for this antenna concept. The grounded dipole antenna 7 and two auxiliary antennas 19, 20 are at the same horizontal level, which is in parallel with the ground plane 1. The main chassis antenna 16 is placed in the vertical plane. The main chassis antenna 16 and the grounded dipole antenna 7 are placed very close to each other. The grounded dipole antenna 7 has a medium length.

Figure 18:
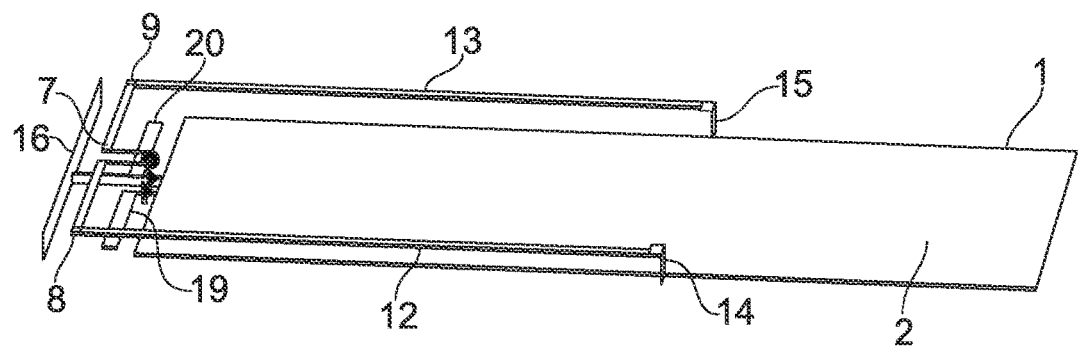
FIG. 18 is a schematic representation of a third embodiment.

FIG. 18 shows a second example combination of four antennas for this antenna concept. The grounded dipole antenna 7 and the two auxiliary antennas 19, 20 are at the different horizontal planes. The two auxiliary antennas 19, 20 are on the same horizontal level as the groundplane 2, and the grounded dipole antenna 7 is disposed in plane substantially parallel thereto. The main chassis antenna 16 is placed in the vertical plane. The main chassis antenna 16 and the grounded dipole antenna 7 are separated by a small distance. The grounded dipole antenna 7 has a medium length.

Figure 19:
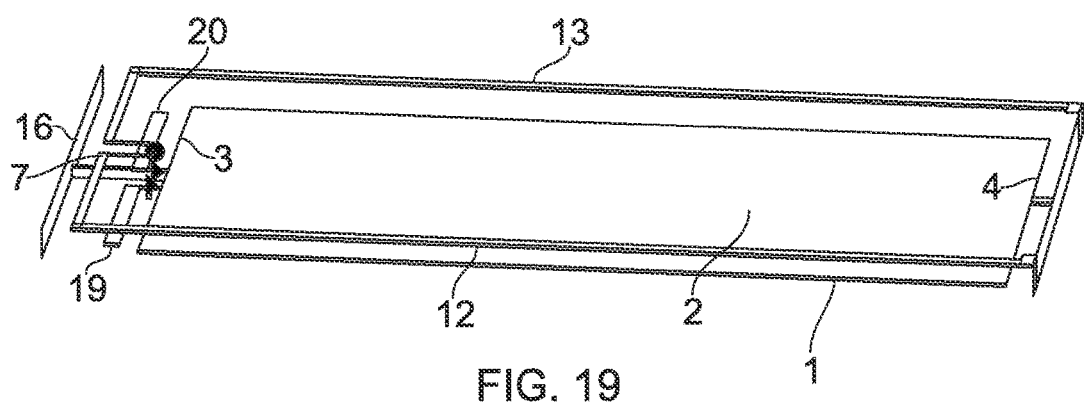
FIG. 19 is a schematic representation of a fourth embodiment.

FIG. 19 shows a third example combination of four antennas for this antenna concept. The grounded dipole antenna 7 and the two auxiliary antennas 19, 20 are in different horizontal planes. The two auxiliary antennas 19, 20 are at the same horizontal level as the groundplane 2, which is also parallel with the grounded dipole antenna 7. The main chassis antenna 16 is placed in the vertical plane. The main chassis antenna 16 and the grounded dipole antenna 7 are separated by a small distance. The grounded dipole antenna 7 has a large length and is configured as or similarly to a loop, the arms 12, 13 being connected together and to the groundplane 2 at an end 4 of the groundplane 2 remote from the main chassis antenna 16 and the auxiliary antennas 19, 20.

Figure 20:
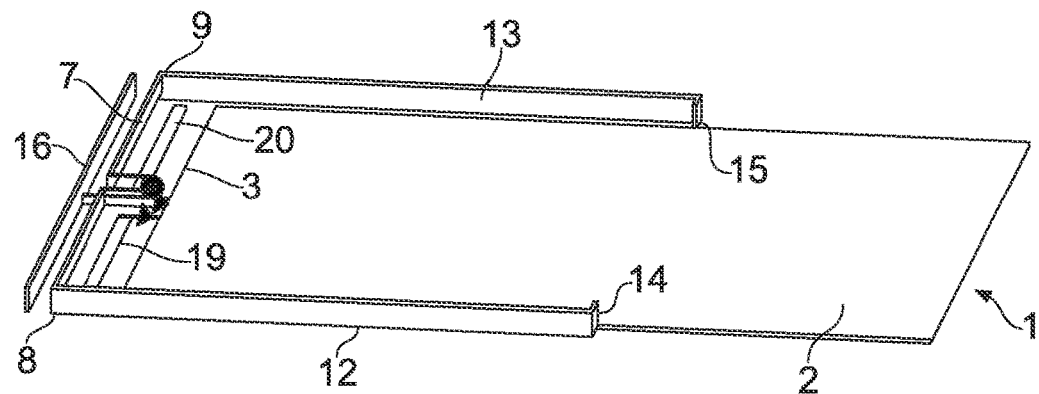
FIG. 20 is a schematic representation of a fifth embodiment.

FIG. 20 shows a fourth example combination of four antennas for this antenna concept. Two auxiliary antennas 19, 20 are in the same horizontal plane as the groundplane 2. The main chassis antenna 16 and the grounded dipole antenna 7 are placed in a vertical level and are substantially parallel at the top end 3 of the groundplane 2. The main chassis antenna 16 and the grounded dipole antenna 7 are separated by a small distance. The grounded dipole antenna 7 has a medium length.

Figure 21:
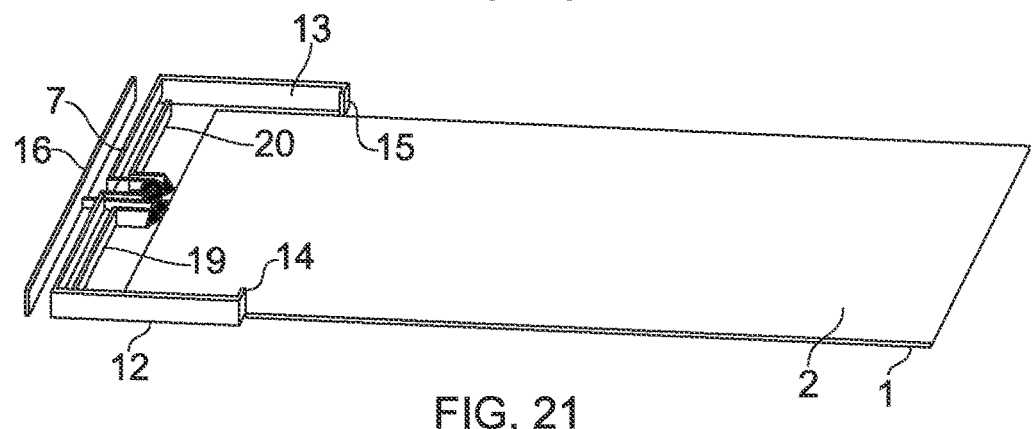
FIG. 21 is a schematic representation of a sixth embodiment.

FIG. 21 below shows a fifth example combination of four antennas for this antenna concept. The main chassis antenna 16, the grounded dipole antenna 7 and the two auxiliary antennas 19, 20 are placed in vertical planes and are substantially parallel to each other at the top end 3 of the groundplane 2, separated by a small distance. The grounded dipole antenna 7 has a short length.

Figure 22:
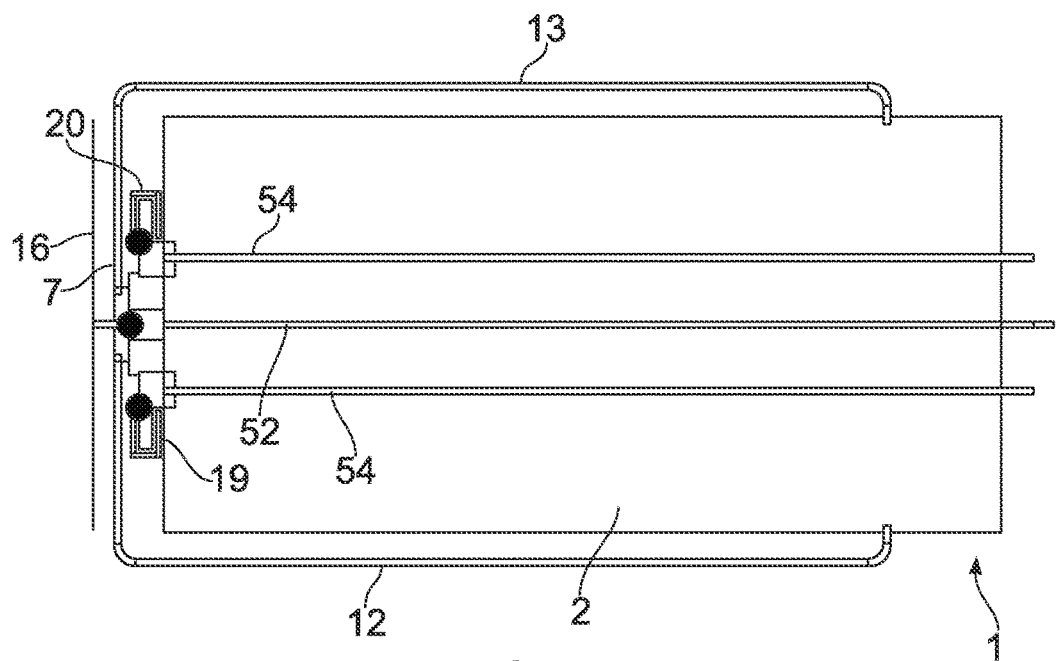
FIGS. 22 and 23 show an arrangement of feeding cables for various embodiments.
Figure 23:
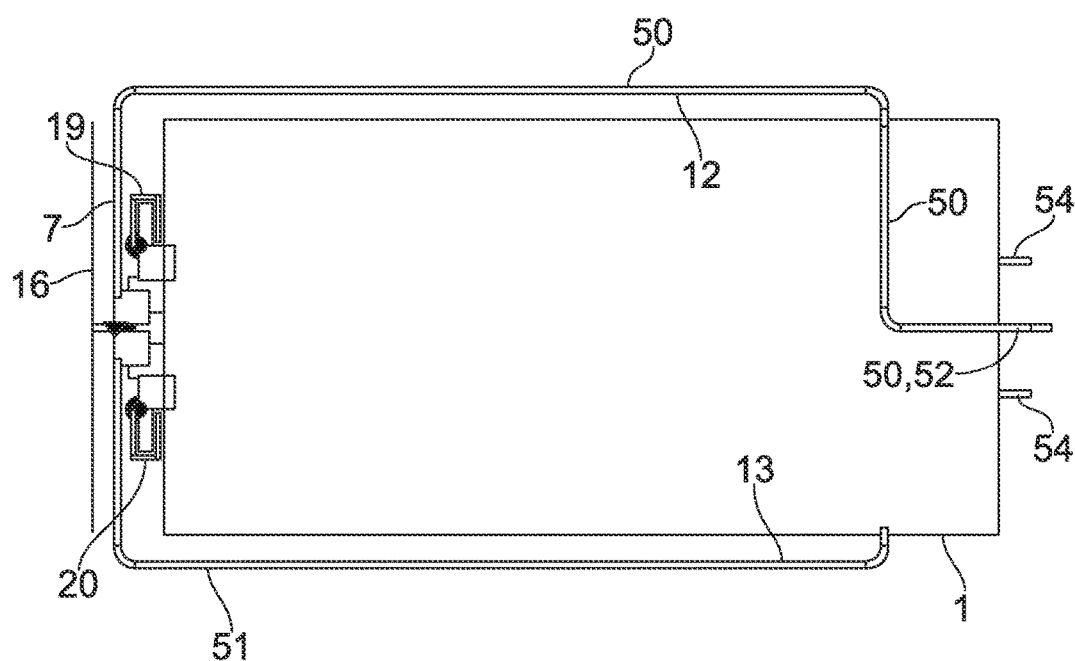

FIGS. 22 and 23 show an arrangement of feeding cables for the various antennas, with a real cable 50 and a dummy cable 51 for the grounded dipole antenna 7 provided on an opposite side of the substrate 1 to the cables 52, 53, 54 for feeding the three chassis antennas 16, 19, 20.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A reconfigurable antenna device comprising:
 i) a substrate having first and second opposed ends and first and second opposed side edges, the substrate incorporating a main groundplane;
 ii) a dipole antenna having first and second arms each having a proximal portion and a distal portion, the proximal portions extending substantially adjacent and parallel to the first end of the substrate and the distal portions respectively extending substantially adjacent and parallel to the first and second side edges of the substrate, wherein distal ends of the first and second arms are connected to the main groundplane or otherwise grounded;
 iii) a main chassis antenna having first and second arms extending substantially adjacent and parallel to the first end of the substrate, the main chassis antenna being configured for excitation by RF currents in the main groundplane; and
 iv) first and second auxiliary chassis antennas, the first auxiliary chassis antenna being disposed at the first end of the substrate substantially adjacent to the proximal portion of first arm of the dipole antenna and the first arm of the main chassis antenna, and the second auxiliary chassis antenna being disposed at the first end of the substrate substantially adjacent to the proximal portion of the second arm of the dipole antenna and the second arm of the main chassis antenna, the first and second auxiliary chassis antennas being configured for excitation by RF currents in the main groundplane,
 wherein the first and second arms of the dipole antenna are substantially symmetrical about a longitudinal center line of the main groundplane.

2. The antenna device as claimed in claim 1, in combination with a casing of a handset, tablet, laptop or other computing device, the casing having an inside and an outside.

3. The antenna device as claimed in claim 2, wherein the arms of the dipole antenna incorporate conductive components of the casing.

4. The antenna device as claimed in claim 2, wherein the arms of the main chassis antenna incorporate conductive components of the casing.

5. The antenna device as claimed in claim 2, wherein the first and/or second auxiliary chassis antennas incorporate conductive components of the casing.

6. The antenna device as claimed in claim 2, wherein the arms of the dipole antenna incorporate conductive tracks formed on the inside of the casing.

7. The antenna device as claimed in claim 2, wherein the arms of the main chassis antenna incorporate conductive tracks formed on the inside of the casing.

8. The antenna device as claimed in claim 2, wherein the first and/or second auxiliary chassis antennas incorporate conductive tracks formed on the inside of the casing.

9. The antenna device as claimed in claim 3, wherein the conductive components are disposed on the outside of the casing.

10. The antenna device as claimed in claim 1, wherein the dipole antenna and the main chassis antenna are configured to excite modes that are substantially orthogonal to one another.

11. The antenna as claimed in claim 1, wherein an RF resonator is disposed between the first and second auxiliary chassis antennas to improve isolation therebetween.

12. The antenna device of claim 1, wherein each antenna has a respective feeding point.

13. The antenna device of claim 12, wherein the feeding points are located proximal each other to allow a single chip or integrated circuit to provide matching circuitry for all of the antennas.

14. The antenna device of claim 1, wherein the main groundplane substantially displays mirror symmetry about the longitudinal center line thereof.

15. The antenna device of claim 14, wherein the feeding points of the dipole antenna and the main chassis antenna are disposed on the center line.

16. The antenna device of claim 15, wherein the feeding points of the first and second auxiliary chassis antennas are disposed substantially symmetrically about the center line.

17. The antenna device of claim 14, wherein the first and second arms of the main chassis antenna are substantially symmetrical about the center line.

18. The antenna device of claim 14, wherein the first and second auxiliary chassis antennas are substantially symmetrical about the center line.

19. The antenna device of claim 14, wherein the dipole antenna is not provided with a balun.

20. The antenna device of claim 19, wherein the dipole antenna is fed by a first, active coaxial cable attached to the first arm, and wherein a dummy cable is attached to the second arm, the dummy cable being substantially symmetric with the active cable.

21. The antenna device of claim 20, wherein the cables follow paths defined, respectively, by the first and second arms of the dipole antenna.

22. The antenna device of claim 14, wherein the main chassis antenna is fed by a cable running along the center line of the main groundplane.

23. The antenna device of claim 14, wherein the first and second auxiliary chassis antennas are fed by first and second cables running substantially symmetrically along either side of the center line of the main groundplane.

24. The antenna device of claim 1, wherein the dipole antenna is provided with a balun.

25. The antenna device as claimed in claim 1, wherein each antenna is provided with at least one matching circuit.

26. The antenna device of claim 25, wherein at least one of the antennas is provided with multiple matching circuits and at least one switch to allow switching between the multiple matching circuits.

27. The antenna device of claim 25, wherein at least one of the matching circuits includes a variable or adjustable capacitor and/or inductor so as to allow the respective antenna to be tuned over a desired frequency range.

* * * * *